United States Patent
Ramu (10) Patent No.: US 8,264,182 B2
(45) Date of Patent: Sep. 11, 2012

(54) MOTOR POWER FACTOR CORRECTION APPARATUS AND METHOD

(75) Inventor: Krishnan Ramu, Blacksburg, VA (US)

(73) Assignee: Ramu, Inc., Blacksburg, VA (US)

( * ) Notice: Subject to any disclaimer, the term of this patent is extended or adjusted under 35 U.S.C. 154(b) by 328 days.

(21) Appl. No.: 12/672,688

(22) PCT Filed: Aug. 13, 2008

(86) PCT No.: PCT/US2008/009658
§ 371 (c)(1),
(2), (4) Date: Feb. 9, 2010

(87) PCT Pub. No.: WO2009/023205
PCT Pub. Date: Feb. 19, 2009

(65) Prior Publication Data
US 2011/0187300 A1 Aug. 4, 2011

(51) Int. Cl.
*G05F 1/70* (2006.01)
*H02P 25/08* (2006.01)
(52) U.S. Cl. ............... 318/438; 318/254.2; 318/701
(58) Field of Classification Search ......... 318/254.1, 318/254.2, 701, 438, 729
See application file for complete search history.

(56) References Cited

U.S. PATENT DOCUMENTS

| | | | | |
|---|---|---|---|---|
| 5,115,181 A * | 5/1992 | Sood | ............ | 318/701 |
| 5,764,019 A * | 6/1998 | Webster | ........ | 318/701 |
| 6,906,503 B2 * | 6/2005 | Lopez-Santillana et al. | . | 323/283 |
| 7,049,786 B1 * | 5/2006 | Toliyat et al. | ............ | 318/254.1 |
| 7,113,380 B2 * | 9/2006 | Youm | ............ | 361/91.1 |
| 7,443,125 B2 * | 10/2008 | Clothier et al. | ............ | 318/701 |
| 8,040,703 B2 * | 10/2011 | Melanson | ............ | 363/89 |
| 2004/0047166 A1 | 3/2004 | Lopez-Santillana | | |
| 2006/0132081 A1 | 6/2006 | Clothier | | |

OTHER PUBLICATIONS

S. G. Oh and R. Krishnan, "Two Phase SRM With Flux Reversal Free Stator: Concept, Analysis, Design and Experimental Verification," in Proc. of IEEE Industry Applications Conference Annual Meeting, vol. 3, pp. 1155-1162, Oct. 2006.
International Search Report dated Nov. 18, 2008 with Written Opinion.

* cited by examiner

Primary Examiner — Bentsu Ro
(74) Attorney, Agent, or Firm — NSIP Law (57) ABSTRACT

A power factor correction system includes a rectifier that rectifies the voltage of an alternating current (ac) power source to produce a voltage waveform that transitions, in a half sinusoid, from a minimum amplitude to a maximum amplitude and back to the minimum amplitude twice in the period of the ac power source. A phase winding of a motor conveys current induced by the voltage waveform, and a regulator regulates the flow of the current conveyed by the phase winding for storage as energy in a storage component.

35 Claims, 8 Drawing Sheets

MOTOR POWER FACTOR CORRECTION APPARATUS AND METHOD

CROSS-REFERENCE TO RELATED APPLICATIONS

This application claims priority to international application PCT/US2008/009658, filed Aug. 13, 2008, which claims priority to U.S. provisional application 60/955,661, filed Aug. 14, 2007.

FIELD OF THE INVENTION

The invention relates to power factor correction of power supplied to an electric motor by an alternating current (ac) to direct current (dc) converting rectifier.

BACKGROUND OF THE RELATED ART

Many times a variable speed motor drive is connected to an ac electrical power source through an ac-to-dc converting diode bridge or an individual diode rectifier and a filter formed by a capacitor and perhaps an inductor. The ac-to-dc converting rectifier receives a discontinuous quasi-sinusoidal current with high peaks and conveys a non-sinusoidal current to the load side of the rectifier. The discontinuity and non-sinusoidal character of the input ac current has four effects. First, the instantaneous current rating of the rectifier must be increased due to the high peaks and discontinuous conduction.

Second, the Fourier spectrum of the input current has a fundamental frequency component at the supply frequency and other components at multiples of twice the supply frequency, such as 2, 4, 6, 8, and 10 times the supply frequency. These non-fundamental frequency components have to be filtered so that they do not circulate a current back to the ac supply (utility supply) input. A large filter is required for this filtering and is mandated in some countries, thus increasing the cost of a load apparatus.

Third, the phase angle between the input ac voltage and the fundamental component of the current drawn by the rectifier is increased. The cosine of this phase angle is known as the power factor in power systems; a power factor that is other than unity results in under utilization of the utility supply since it causes a high reactive power component to be drawn. Home owners and small commercial establishments only pay for real power consumption, the reactive power consumption necessitated by the rectifier in the ac-to-dc rectification is not paid for by these clients. As a result, the utility must absorb the cost of the reactive power consumption, thereby suffering a monetary loss. Both the utility and users will gain if the entire generating capacity of the utility is completely used in real power consumption in the loads with zero reactive power consumption.

Fourth, when the root mean square (rms) amplitude of the electrical power source's ac voltage diminishes, due to overloading or other causes, the rms amplitude of the rectified dc voltage also changes. For a power electronic converter that receives this rectified dc voltage so as to supply a variable voltage or current and perhaps a variable frequency to a motor, the diminished rms amplitude of the input voltage negatively impacts the performance of the motor by decreasing the speed at which a full load torque can be produced and reducing the motor's capability to provide the torque and speed for which it is rated.

Consider a related art switched reluctance motor (SRM) drive system having a power electronic converter connected to an ac power source by a diode bridge rectifier. This related art system has three major disadvantages. First, when the rms voltage amplitude of the ac power source is reduced, as often occurs in many unregulated utility systems, the bridge rectifier's output dc rms voltage amplitude is diminished, thereby limiting the operational capability of the motor. Second, the current drawn by the bridge rectifier is non-sinusoidal, which induces noise and harmonics onto the utility's power lines. Third, the power factor of the system presented to the utility is less than unity, thereby negatively impacting the utility by not making use of its entire power generation for real power consumption.

Figure 1:
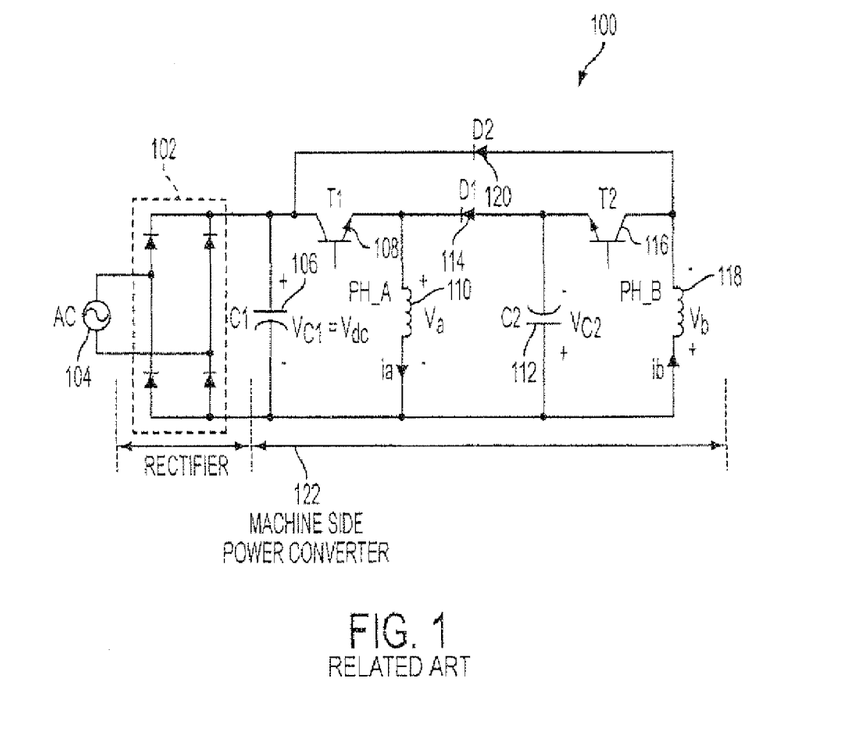
FIG. 1 illustrates a related art power converter for a two-phase motor.

FIG. 1 illustrates a related art power converter 100 for a two-phase motor. Power converter 100 includes a bridge rectifier 102 that receives ac power from an ac power source 104 and rectifies the voltage of the ac power to produce a dc power source whose energy is stored by a capacitor 106. A phase A transistor 108 regulates the flow of energy from storage capacitor 106 through a phase A winding 110 of the motor. Energy not used by the motor that is discharged by phase A winding 110 is stored within a capacitor 112 via a circuit completed by a diode 114. A phase B transistor 116 regulates the flow of energy from storage capacitor 112 through a phase B winding 118 of the motor. Energy not used by the motor that is discharged by phase B winding 118 is conveyed to and stored within capacitor 106 via a circuit completed by a diode 120.

A machine side 122 of power converter 100 has one transistor, one capacitor, and one diode per machine phase, instead of two transistors and two diodes per phase as does an asymmetric converter. Also, power converter 100 has no capacitor in between its two phases. Thus, in accordance with the operation of power converter 100 described above, a reduction of the input ac rms voltage reduces the dc rms voltage available to the motor phases, resulting in a diminished operational capability of the motor.

All reference material cited herein is hereby incorporated into this disclosure by reference.

SUMMARY OF THE INVENTION

To overcome the above-mentioned drawbacks of the related art, a power factor correction (PFC) circuit may be employed to compensate the effect of a changing ac line rms voltage amplitude by keeping the dc input rms voltage to a machine side of a power converter constant. Additionally, employing a motor phase winding as an inductor within the PFC circuit serves dual purposes of providing an inductor for the PFC circuit and using the current flow though this inductor to produce torque and, hence, output power for the motor. These twin advantages are highly advantageous.

Accordingly, an object of the invention is to overcome the above-described shortcomings and problems encountered in the related art.

Another object of the invention is to reduce the number of power components required for a power converter.

Still another object of the invention is to provide a highly efficient power converter.

A further object of the invention is to provide a power converter having a full range of speed control under adverse ac power conditions.

A further object of the invention is to reduce the size of a power converter's packaging.

A further object of the invention is to reduce the overall cost of a motor drive.

The objects of the invention may be achieved in whole or in part by a power factor correction system having a rectifier that rectifies the voltage of an alternating current (ac) power source to produce a voltage waveform that transitions, in a half sinusoid, from a minimum amplitude to a maximum amplitude and back to the minimum amplitude twice in the period of the ac power source. A phase winding of a motor conveys current induced by the voltage waveform, and a regulator regulates the flow of the current conveyed by the phase winding for storage as energy in a storage component.

The objects of the invention may further be achieved in whole or in part by a motor system having a motor, a rectifier, and a power factor correction circuit. The rectifier rectifies the voltage of an ac power source to produce a voltage waveform that transitions, in a half sinusoid, from a minimum amplitude to a maximum amplitude and back to the minimum amplitude twice in the period of the ac power source. A phase winding of a motor conveys current induced by the voltage waveform, and a regulator regulates the flow of the current conveyed by the phase winding for storage as energy in a storage component.

The objects of the invention may further be achieved in whole or in part by a power factor correction method. According to this method, the voltage of an ac power source is rectified to produce a voltage waveform that transitions from a minimum amplitude to a maximum amplitude and back to the minimum amplitude, in a half sinusoid, twice in the period of the ac power source. The voltage waveform is applied to a phase winding of a motor to induce the conveyance of a current through the phase winding. The flow of the current conveyed by the phase winding for storage as energy in a storage component is regulated so as to produce a constant voltage potential across the storage component.

BRIEF DESCRIPTION OF THE DRAWINGS

Preferred embodiments of the invention will be described in the following paragraphs of the specification and may be better understood when read in conjunction with the attached drawings, in which.

DETAILED DESCRIPTION OF THE INVENTION

Figure 2A:
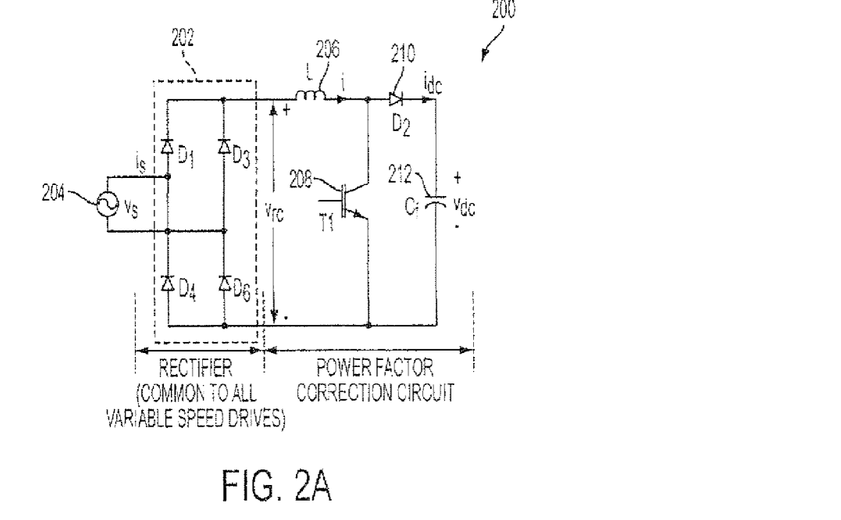
FIG. 2A illustrates a power factor correction (PFC) apparatus for one phase winding of a motor.

FIG. 2A illustrates a power factor correction (PFC) apparatus 200 for one phase winding of a motor. PFC apparatus 200 has a bridge rectifier 202 that rectifies the voltage of ac power provided by an alternating current (ac) power source 204 to produce a direct current (dc) power source that is supplied to a phase winding 206 of a motor (not shown). A transistor 208 is electrically connected in parallel with a series connection of a diode 210 and a capacitor 212 and regulates the flow of current through phase winding 206 for storage as energy within capacitor 212.

More specifically, when transistor 208 is turned on, current flows from bridge rectifier 202 through phase winding 206 and transistor 208 to the circuit ground. When transistor 208 is turned off, current flows from bridge rectifier 202 through phase winding 206, diode 210, and capacitor 212 to circuit ground, thereby charging capacitor 212. The dc voltage potential developed across capacitor 212 by the charging is regulated by the switching duty cycle (i.e., ratio of on time to combined on and off time, also expressed as the ratio of on time to the pulse width modulation period) of transistor 208. Thus, PFC apparatus 200 operates to regulate the dc voltage developed across capacitor 212 and maintain a desired voltage potential even when the root mean square (rms) voltage amplitude of ac power source 204 diminishes.

Figure 2B:
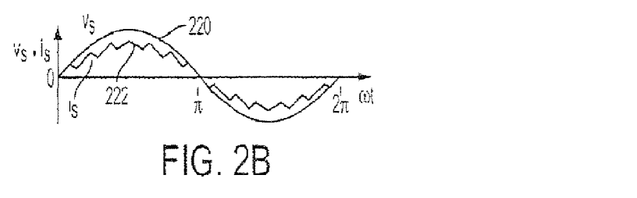
FIGS. 2B-2E illustrate waveforms related to the PFC apparatus of FIG. 2A.
Figure 2C:
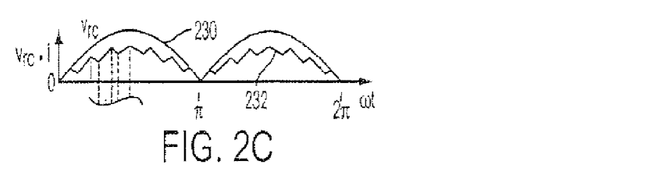
Figure 2D:
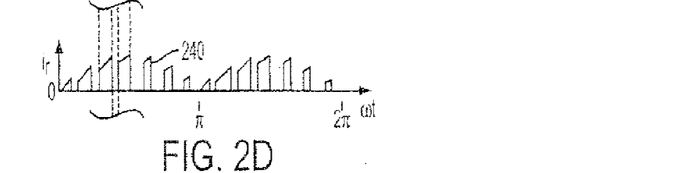
Figure 2E:
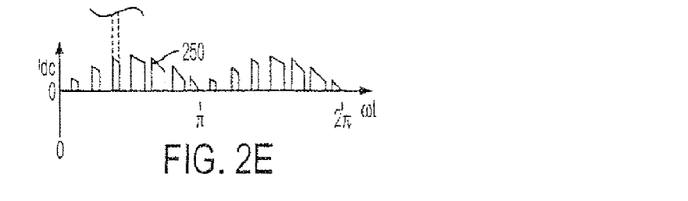

FIGS. 2B-2E illustrate how the switching operation of transistor 208 regulates the flow of current through PFC apparatus 200 over a cycle of the ac power. When transistor 208 is turned on, the entire input ac voltage, after rectification, is applied to phase winding 206 resulting in increasing current. When the current flow exceeds a desired amount, the transistor 208 is turned off. FIG. 2B illustrates amplitudes of an ac voltage 220 and current 222 provided by ac power source 204 to bridge rectifier 202. FIG. 2C illustrates amplitudes of a dc voltage 230 and current 232 output by bridge rectifier 202. FIG. 2D illustrates the amplitude of a current 240 flowing through transistor 208 due to the switching operation of transistor 208, and FIG. 2E illustrates the amplitude of a current 250 flowing into capacitor 212 due to the switching operation of transistor 208.

The periods of time current flows through transistor 208, illustrated in FIG. 2D, is representative of the periods during which transistor 208 is turned on. A control circuit (not shown) may regulate the switching operation of transistor 208 to achieve one or more benefits of maintaining: (a) a constant rms voltage potential across capacitor 212 for a significant ac rms voltage amplitude input fluctuation, such as (minus) 30% or more, (b) a sinusoidal ac input current, and (c) a unity power factor.

The principles described above in connection with one phase winding may similarly be applied to multiple phase windings.

Figure 3:
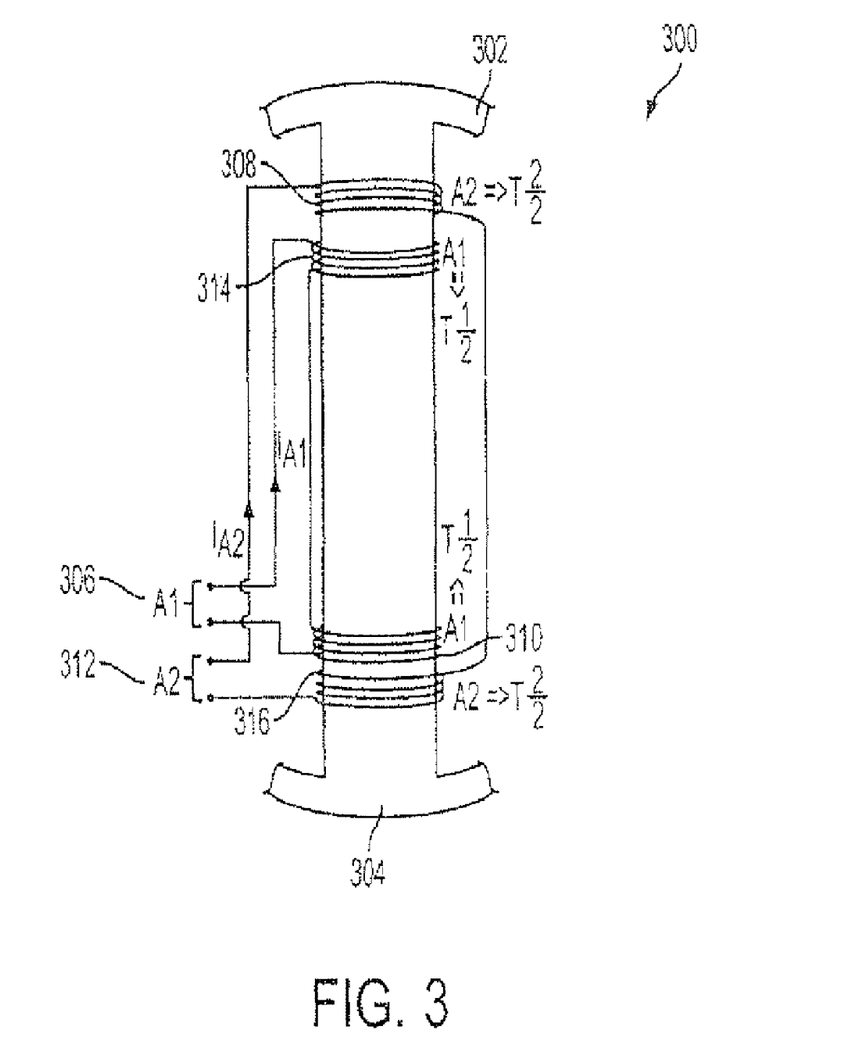
FIG. 3 illustrates two phase windings disposed on opposite poles of a motor stator as separated winding portions.

FIG. 3 illustrates two phase windings disposed on opposite poles of a motor stator 300 as separated winding portions. Stator 300 is a two-pole stator having diametrically opposite poles 302, 304. A phase A1 winding 306 having a total of $T_1$ winding turns is separated into two winding portions 308, 310 of equal, $T_1/2$ turns, each or preferably of unequal turns to produce maximum leakage inductance of the two winding portions so that they can be independently controlled. The reason for having unequal turns is to optimize the input power factor correction and have a low-loss switching frequency for a power factor correction (PFC) transistor. It is also preferred to have separation between the two winding portions so that the leakage inductance of the winding portions is high. For example, one pole may have one portion of phase A and its diametrically opposite pole may have the remaining portion of phase A, thus having two portions at two places that are separated from each other. Phase A1 winding portion 308 is wound around stator pole 302 with $k_1T_1$ turns, where $k_1$ is a fraction, and phase A1 winding portion 310 is wound around stator pole 304 with $(1-k_1)T_1$ turns. Similarly, a phase A2 winding 312 having a total of $T_2$ winding turns is separated into two winding portions 314, 316 of $k_1T_2$ and $(1-k_1)T_2$ turns each, respectively. Phase A2 winding portion 314 is wound around stator pole 302 with $k_1T_2$ turns, and phase A2 winding portion 316 is wound around stator pole 304 with $(1-k_1)T_2$ turns.

The number of turns T1 and T2 need not be equal and there may be some advantages in keeping them unequal so that coupling need not be perfect to inject a desired current in the windings. Similarly, phase A1 winding portions 308 and 310 need not have equal turns and phase A2 winding portions 314 and 316 need not have equal turns. Phase A1 winding portions 308 and 310 may have a combined magneto-motive force (mmf) that is equivalent to that of a single portion phase winding having the same number of winding turns. Similarly, phase A2 winding portions 314 and 316 may have a combined mmf that is equivalent to that of a single portion phase winding having the same number of winding turns.

Either or both of phase A1 and A2 windings 306, 312 may be used as phase winding 206 in FIG. 2A.

Figure 4:
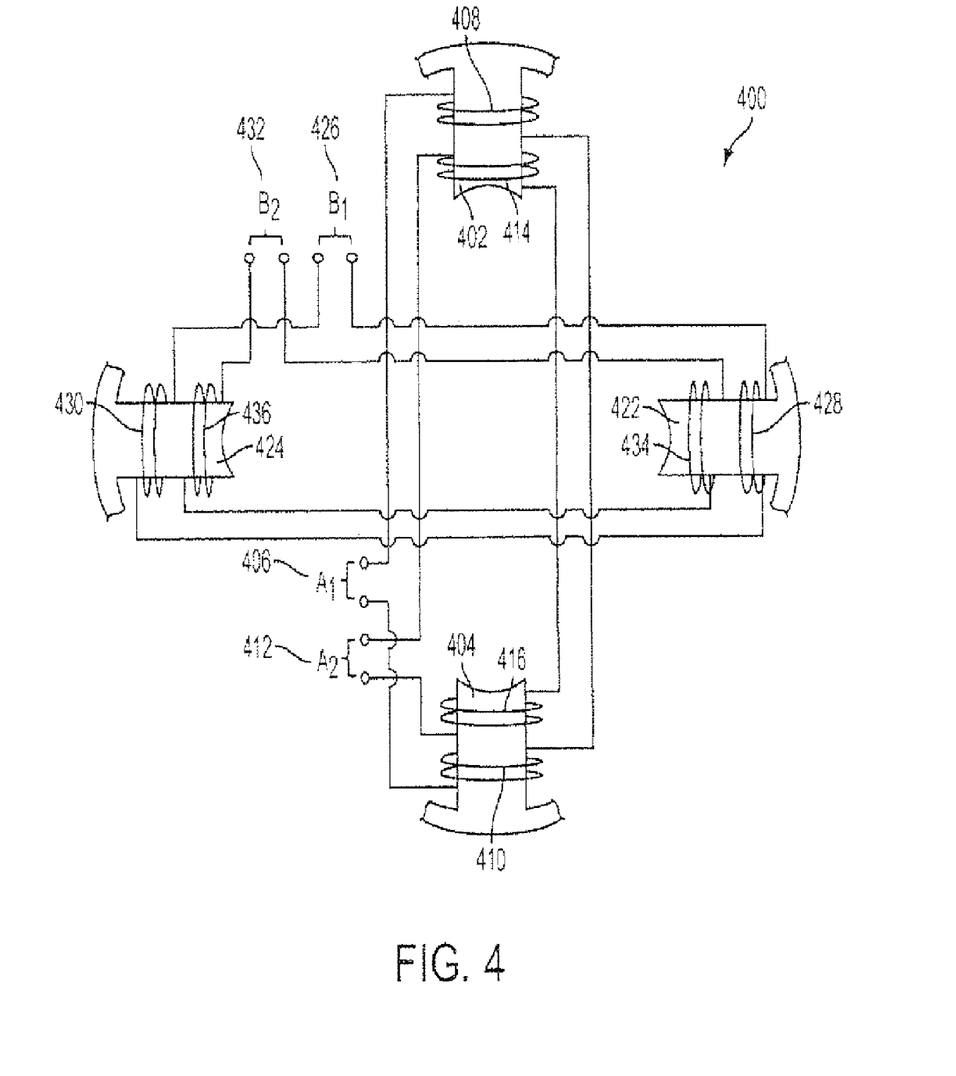
FIG. 4 illustrates two sets of phase windings disposed on each of two sets of opposite poles of a motor stator.

FIG. 4 illustrates two sets of phase windings disposed on each of two sets of opposite poles of a motor stator 400. Stator 400 is a four-pole stator having a first set of diametrically opposite poles 402, 404 and a second set of diametrically opposite poles 422, 424. A phase A1 winding 406 having a total of $T_1$ winding turns is separated into two winding portions 408, 410 of less than $T_1$ turns each. Phase A1 winding portion 408 is wound around stator pole 402, and phase A1 winding portion 410 is wound around stator pole 404. Similarly, a phase A2 winding 412 having a total of $T_2$ winding turns is separated into two winding portions 414, 416 of less than $T_2$ turns each. Phase A2 winding portion 414 is wound around stator pole 402, and phase A2 winding portion 416 is wound around stator pole 404.

A phase B1 winding 426 having a total of $T_3$ winding turns is separated into two winding portions 428, 430 of less than $T_3$ turns each. Phase B1 winding portion 428 is wound around stator pole 422, and phase B1 winding portion 430 is wound around stator pole 424. Similarly, a phase B2 winding 432 having a total of $T_4$ winding turns is separated into two winding portions 434, 436 of less than $T_4$ turns each. Phase B2 winding portion 434 is wound around stator pole 422, and phase B2 winding portion 436 is wound around stator pole 424. Similar configurations may be implemented for stators having a different number of stator poles.

Figure 5:
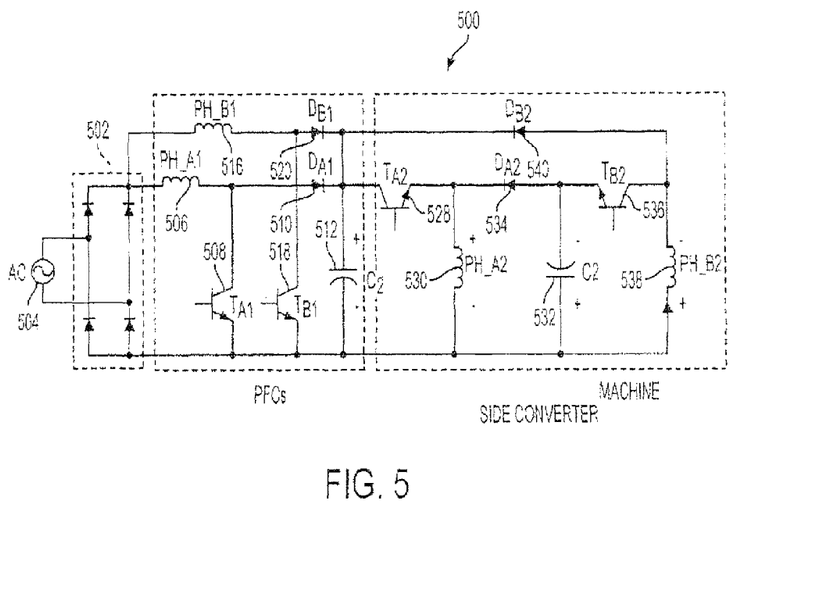
FIG. 5 illustrates a power converter for a switched reluctance motor (SRM) that may employ the stator illustrated in FIG. 4.

FIG. 5 illustrates a power converter 500 for a switched reluctance motor (SRM) that may employ the stator illustrated in FIG. 4. Power converter 500 has a bridge rectifier 502 that rectifies the voltage of ac power provided by ac power source 504 to produce a dc power source that is supplied to a phase A1 winding 506 of the motor. A transistor 508 is electrically connected in parallel with a series connection of a diode 510 and a capacitor 512 and regulates the flow of current through phase A1 winding 506 for storage as energy by capacitor 512. Similarly, a transistor 518 is electrically connected in parallel with a series connection of a diode 520 and capacitor 512 and regulates the flow of current through phase B1 winding 516 for storage as energy by capacitor 512.

More specifically, when transistor 508 is turned on, current flows from bridge rectifier 502 through phase A1 winding 506 and transistor 508 to circuit ground. When transistor 508 is turned off, current flows from bridge rectifier 502 through phase A1 winding 506, diode 510, and capacitor 512 to circuit ground, thereby charging capacitor 512. Similarly, when transistor 518 is turned on, current flows from bridge rectifier 502 through phase B1 winding 516 and transistor 518 to circuit ground. When transistor 518 is turned off, current flows from bridge rectifier 502 through phase B1 winding 516, diode 520, and capacitor 512 to circuit ground, thereby charging capacitor 512. The dc voltage potential developed across capacitor 212 is regulated by the switching duty cycles of transistors 508 and 518.

A transistor 528 regulates the flow of energy from storage capacitor 512 through a phase A2 winding 530 of the motor. Energy not used by the motor that is discharged by phase A2 winding 530 is stored within capacitor 532 via a circuit completed by a diode 534. A transistor 536 regulates the flow of energy from storage capacitor 532 through a phase B2 winding 538 of the motor. Energy not used by the motor that is discharged by phase B2 winding 538 is conveyed to capacitor 512 for storage via a circuit completed by a diode 540.

Phase A1 and A2 windings 406, 412 provide mmf for a phase A of the switched reluctance motor, and phase B1 and B2 windings 426, 432 provide mmf for a phase B of the motor. Phase windings A1 406 and B1 426 are utilized as both PFC inductors and machine phases producing torque and power, whereas phase windings A2 412 and B2 432 are exclusively utilized for producing torque and power.

Phase A transistors 508 and 528 may be switched at the same time with the same dwell time but not necessarily the same duty cycles. The duty cycle of transistor 508 is determined in accordance with achieving: (a) a constant rms voltage potential across capacitor 512 for a significant ac peak rms amplitude input fluctuation, such as (minus) 30% or more, (b) a sinusoidal ac input current, (c) a unity power factor, or (d) other design criteria. The duty cycle of transistor 528 is determined by the current regulation requirements of phase A2 winding 530.

Similarly, phase B transistors 518 and 536 may be switched at the same time with the same dwell time but not necessarily the same duty cycles. The duty cycle of transistor 518 is determined in accordance with achieving: (a) a constant rms voltage potential across capacitor 512 for a significant ac peak rms amplitude input fluctuation, such as (minus) 30% or more, (b) a sinusoidal ac input current, (c) a unity power factor, or (d) other design criteria. The duty cycle of transistor 536 is determined by the current regulation requirements of phase B2 winding 538.

Although FIG. 5 illustrates two PFC circuits and two machine phases, power converter 500 may be modified to suit various choices in the number of PFCs and machine phases.

Figure 6:
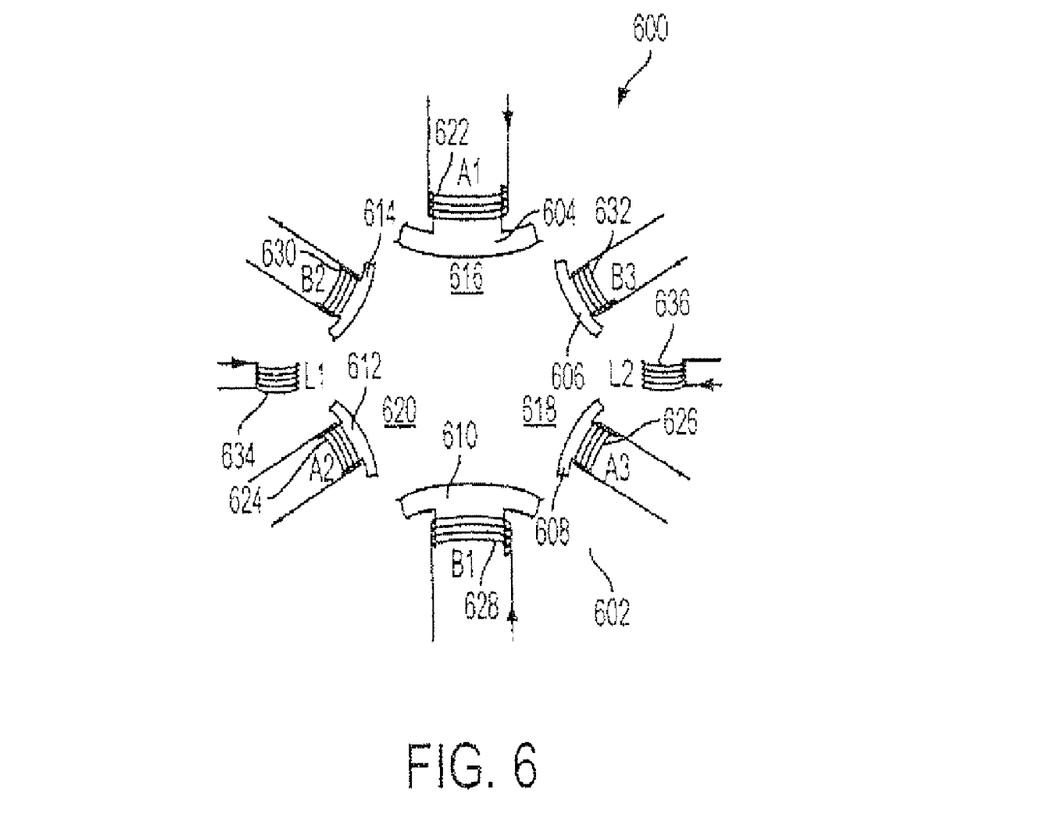
FIG. 6 illustrates a 6/3 SRM having two phase windings wound around the back iron of its stator.

FIG. 6 illustrates a 6/3 SRM 600 having two phase windings wound around the back iron 602 of the stator. Motor 600 has 6 stator poles 604-614 and 3 rotor poles 616-620. A 6/3 SRM is described more fully by Krishnan Ramu and Nimal Lobo in U.S. Pat. No. 7,015,615, issued March 2006, and by S. G. Oh and R. Krishnan in "Two Phase SRM With Flux Reversal Free Stator: Concept, Analysis, Design and Experimental Verification," in Proc. of IEEE Industry Applications Conference Annual Meeting, vol. 3, pp. 1155-1162, October 2006.

Motor 600's phase A winding 720 (see FIG. 7) comprises a winding A1 622 that is series connected with parallel connected windings A2 624 and A3 626. Likewise, motor 600's phase B winding 728 comprises a winding B1 628 series connected with parallel connected windings B2 630 and B3 632. A winding L1 634 is wound around back iron 602 and disposed between auxiliary stator poles 612 and 614, and a winding L2 636 is wound around back iron 602 and disposed between auxiliary stator poles 606 and 608. Windings L1 634 and L2 636 are electrically connected in series (i.e., L=L1+L2) and used as inductive phase winding L 706 in PFC circuit 732 illustrated in FIG. 7. The current flowing through windings L1 634 and L2 636 due to PFC circuit action also produces a flux to support the torque generation for both phases A and B.

Figure 7:
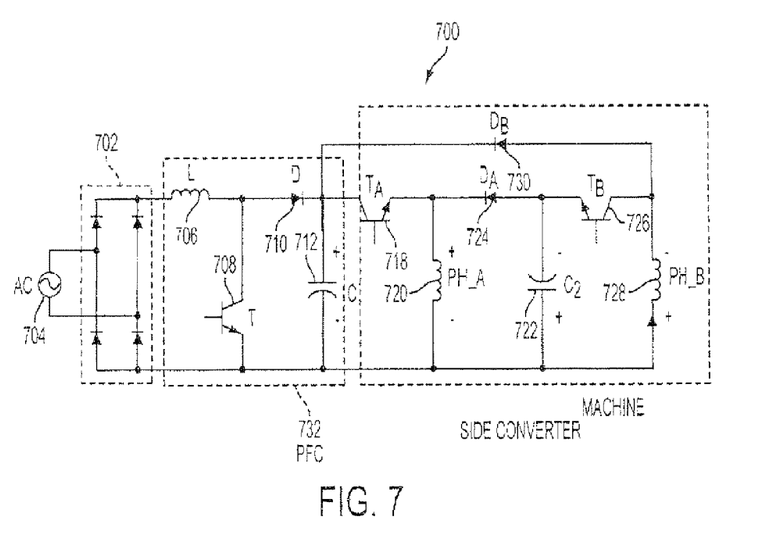
FIG. 7 illustrates a power converter for the 6/3 SRM illustrated in FIG. 6.

FIG. 7 illustrates a power converter 700 for 6/3 SRM 600 illustrated in FIG. 6. Power converter 700 has a bridge rectifier 702 that rectifies the voltage of ac power provided by ac power source 704 to produce a dc power source that is supplied to phase L winding 706 of motor 600. A transistor 708 is electrically connected in parallel with a series connection of a diode 710 and a capacitor 712 and regulates the flow of current through phase L winding 706 for storage as energy by capacitor 712.

More specifically, when transistor 708 is turned on, current flows from bridge rectifier 702 through phase L winding 706 and transistor 708 to circuit ground. When transistor 708 is turned off, current flows from bridge rectifier 702 through phase A1 winding 706, diode 710, and capacitor 712 to circuit ground, thereby charging capacitor 712. The dc voltage potential developed across capacitor 712 is regulated by the switching duty cycle of transistor 708.

A transistor 718 regulates the flow of energy from storage capacitor 712 through phase A winding 720 of motor 600. Energy not used by motor 600 that is discharged by phase A winding 720 is stored within capacitor 722 via a circuit completed by a diode 724. A transistor 726 regulates the flow of energy from storage capacitor 722 through phase B winding 728 of motor 600. Energy not used by motor 600 that is discharged by phase B winding 728 is conveyed to capacitor 712 for storage via a circuit completed by a diode 730.

Excitation of PFC circuit phase L winding 706 (i.e., phase windings L1 634 and L2 636) in SRM 600 produces flux in back iron 602 of the machine in the same direction as the fluxes produced by phases A and B. Therefore, there are no flux reversals in the stator iron. This reduces the core losses, thus enhancing motor 600's efficiency. In other words, phase L winding 706 (i.e., phase windings L1 634 and L2 636) both: (a) is used as an inductor in PFC circuit 732 and (b) enhances the production of torque or generates the torque in the machine.

Phase windings A2 624, A3 626, B2 630, and B3 632 are optional and their excitation can be provided by phase L1 634 and L2 636 windings, thereby reducing the number of connections and saving manufacturing labor. This does not obviate the need for the poles on which the windings become optional; they are required to carry the flux produced by the back iron phase windings L1 634 and L2 636 and main pole windings A1 622 and B1 628.

The back iron winding configuration of SRM 600 in conjunction with power converter 700 reduces the number of required PFC circuits to one and reduces the transistor and diode requirement to one of each in PFC circuit 732. Thus, compact electronic packaging and a reduced number of components may be achieved in comparison with the four pole two-phase motor discussed in connection with FIGS. 3-5.

SRM 600 works on the basis of a variable reluctance principle, there is no mutual inductance based torque in this machine. Therefore, the machine is excluded from a class of hybrid permanent magnet-switched reluctance machines in which the torque is based on mutual coupling and flux reversals.

The number of turns in phase L1 634 and phase L2 636 windings is determined by the number of turns in phases A 720 and phase B 728 windings as well as the switching frequency of PFC circuit 732.

Both sinusoidal and trapezoidal current switching may be implemented for the PFC circuits disclosed herein.

Figure 8:
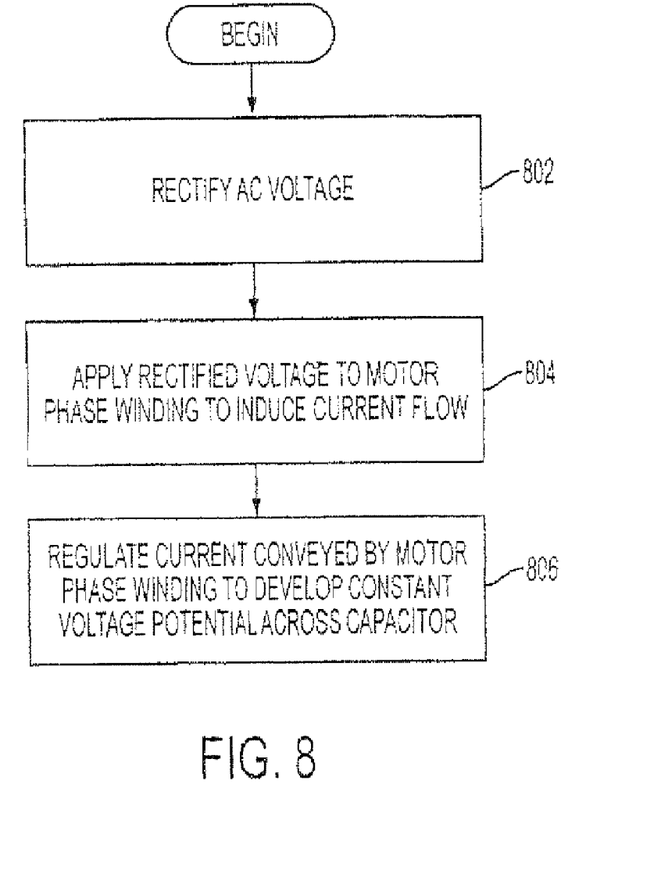
FIG. 8 illustrates a flow chart of a method for operating the PFC apparatus illustrated in FIG. 2A.

FIG. 8 illustrates a flow chart of a method for operating the PFC apparatus illustrated in FIG. 2A. According to this method, an ac voltage provided by ac power source 204 is rectified 802 by bridge rectifier 202 to produce a voltage waveform that transitions from a minimum amplitude to a maximum amplitude and back to the minimum amplitude, in a half sinusoid, twice in the period of the ac power source, as illustrated in FIG. 2C. Transistor 208 is activated so as to allow the voltage waveform developed across phase winding 206 and transistor 208 to induce current flow 804 through phase winding 206 and transistor 208. Current flow through transistor 208 is regulated 806, by repeatedly turning transistor 208 on and off, so that energy stored within phase winding 206 is discharged through diode 210 and stored within capacitor 212 at times when transistor 208 is turned off, so as not to conduct current. The regulation of current through transistor 208 is executed so as to develop a desired voltage potential across capacitor 212 having a constant, or near constant, amplitude.

The foregoing description illustrates and describes the invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further intended to explain best modes known of practicing the invention and to enable others skilled in the art to utilize the invention in these and other embodiments, with the various modifications that may be required by the particular applications or uses of the invention. Accordingly, the description is not intended to limit the invention to the form disclosed herein.

What is claimed is:

1. A power factor correction system comprising:
   a first rectifier that rectifies the voltage of an alternating current (ac) power source to produce a voltage waveform that transitions from a minimum amplitude to a maximum amplitude and back to the minimum amplitude, in a half sinusoid, twice in the period of the ac power source;
   a first phase winding of a motor that conveys current induced by the voltage waveform;
   a first storage component;
   a first regulator that regulates the flow of current conveyed by the first phase winding to the first storage component so as to store energy in the first storage component;
   a second phase winding of the motor;
   a second regulator that regulates the discharge of energy stored by the first storage component by conducting current through the second phase winding; and
   no circuit path exists for the first storage component to discharge stored energy by conducting current through the first phase winding.

2. The power factor correction system of claim 1 wherein one or more turns of the first phase winding are wound around a first stator pole of a stator of the motor and one or more turns are wound around a second stator pole of the motor.

3. The power factor correction system of claim 2 wherein the first stator pole is diametrically opposed on the stator to the second stator pole.

4. The power factor correction system of claim 2, further comprising a third phase winding of the motor having one or more turns of its windings wound around the first stator pole and one or more turns wound around the second stator pole.

5. The power factor correction system of claim 1, wherein:
   one or more turns of the second phase winding are wound around a first stator pole of a stator of the motor and one or more turns are wound around a second stator pole, and the turns of the second phase winding wound around the first stator pole are electrically connected in parallel with the turns of the second phase winding wound around the second stator pole.

6. The power factor correction system of claim 1, wherein:
one or more turns of the second phase winding are wound around a first stator pole of a stator of the motor and one or more turns are wound around a second stator pole, and
the turns of the second phase winding wound around the first stator pole are electrically connected in series with the turns of the second phase winding wound around the second stator pole.

7. The power factor correction system of claim 1 wherein the first phase winding is wound around the back iron of a stator of the motor.

8. The power factor correction system of claim 7 wherein one or more turns of the first phase winding are wound around a first portion of the back iron of the stator and one or more turns are wound around a second portion of the back iron that is diametrically opposed to the first portion.

9. The power factor correction system of claim 7, wherein:
one or more turns of the second phase winding are wound around a first stator pole of a stator of the motor and one or more turns are wound around a second stator pole, and
the turns of the second phase winding wound around the first stator pole are electrically connected in parallel with the turns of the second phase winding wound around the second stator pole.

10. The power factor correction system of claim 7, wherein:
one or more turns of the second phase winding are wound around a first stator pole of a stator of the motor and one or more turns are wound around a second stator pole, and
the turns of the second phase winding wound around the first stator pole are electrically connected in series with the turns of the second phase winding wound around the second stator pole.

11. The power factor correction system of claim 1, further comprising:
a third phase winding of the motor that conveys current induced by the voltage waveform; and
a third regulator that regulates the flow of current conveyed by the third phase winding to the first storage component so as to store energy in the first storage component.

12. The power factor correction system of claim 11 wherein:
one or more turns of the first phase winding are wound around a first stator pole of a stator of the motor and one or more turns are wound around a second stator pole of the motor, and
one or more turns of the second phase winding are wound around a third stator pole of the motor and one or more turns are wound around a fourth stator pole of the motor.

13. The power factor correction system of claim 12 wherein:
the first stator pole is diametrically opposed on the stator to the second stator pole, and
the third stator pole is diametrically opposed on the stator to the fourth stator pole.

14. The power factor correction system of claim 12 further comprising:
a third phase winding of the motor having one or more turns of its windings wound around the first stator pole and one or more turns wound around the second stator pole; and
a fourth phase winding of the motor having one or more turns of its windings wound around the third stator pole and one or more turns wound around the fourth stator pole.

15. The power factor correction system of claim 1, further comprising:
a second storage component, wherein
the second phase winding discharges stored energy by conducting current through the second storage component so as to store energy in the second storage component.

16. The power factor correction system of claim 15, further comprising:
a third phase winding of the motor; and
a third regulator that discharges energy stored by the second storage component by conducting current through the third motor phase winding.

17. The power factor correction system of claim 16, wherein:
the first phase winding comprises two separate winding portions that are wound on diametrically opposite portions of the back iron of a stator of the motor,
the second phase winding comprises three separate winding portions that are each wound on a separate pole of the stator, and
the third phase winding comprises three separate winding portions that are each wound on a separate pole of the stator.

18. The power factor correction system of claim 17, wherein flux produced by the first phase winding is in the same direction as flux produced by the second and third phase windings.

19. The power factor correction system of claim 16, wherein flux produced by the first phase winding is in the same direction as flux produced by the second and third phase windings.

20. The power factor correction system of claim 1, wherein current induced within the first phase winding by the voltage waveform generates torque that is applied to the motor.

21. A motor system comprising:
a motor;
a rectifier that rectifies the voltage of an alternating current (ac) power source to produce a voltage waveform that transitions from a minimum amplitude to a maximum amplitude and back to the minimum amplitude, in a half sinusoid, twice in the period of the ac power source;
a power factor correction circuit comprising:
a first phase winding of the motor that conveys current induced by the voltage waveform;
a storage component; and
a first regulator that regulates the flow of current conveyed by the first phase winding to the storage component so as to store energy in the storage component;
a second phase winding of the motor; and
a second regulator that regulates the discharge of energy stored by the storage component by conducting current through the second phase winding, wherein:
current induced within the first phase winding by the voltage waveform generates torque that is applied to the motor, and
no circuit path exists for the storage element to discharge stored energy by conducting current through the first phase winding.

22. The motor system of claim 21 wherein the motor is a permanent magnet machine.

23. The motor system of claim 21 wherein the motor is a switched reluctance motor.

24. The motor system of claim 21 wherein the motor operates on the basis of variable reluctance and without mutual inductance based torque.

25. The motor system of claim 21, wherein:
the motor has four auxiliary stator poles, two main stator poles, and three rotor poles,
the first phase winding comprises two separate winding portions that are wound on diametrically opposite portions of the back iron of a stator of the motor, and
excitation of the first phase winding generates flux through the auxiliary stator poles.

26. The motor system of claim 25, wherein:
the motor has a multiple of four auxiliary stator poles, a multiple of two main stator poles, and a multiple of three rotor poles, and
all flux generated in the back iron flows in the same direction.

27. The motor system of claim of 25, wherein the stator poles carry generated flux in the same direction.

28. The motor system of claim 25, wherein the motor has two or more phases.

29. The motor system of claim of 21, wherein the first phase winding comprises two separate winding portions, for power factor correction, that are wound on diametrically opposite portions of the back iron of a stator of the motor where flux flowing through the stator does not reverse direction.

30. A power factor correction method comprising:
rectifying the voltage of an alternating current (ac) power source to produce a voltage waveform that transitions from a minimum amplitude to a maximum amplitude and back to the minimum amplitude, in a half sinusoid, twice in the period of the ac power source;
applying the voltage waveform to a phase winding of a motor to induce the conveyance of current through the phase winding; and
regulating the flow of current conveyed by the phase winding to a storage component so as to store energy in the storage component and produce a constant voltage potential across the storage component.

31. The power factor correction method of claim 30, further comprising applying torque generated by the conveyance of the current through the phase winding to a rotor of the motor.

32. A power factor correction device comprising:
first and second switches;
a first capacitive element; and
a first unidirectional current element that conducts current unidirectionally, wherein:
the first and second switches, first capacitive element, and first unidirectional element are coupled such that when coupled with first and second windings of a motor and a full-wave rectified voltage source:
the full-wave rectified voltage source conducts current through the first winding, when the first switch is in a conductive state,
the full-wave rectified voltage source conducts current through the first winding, first unidirectional current element, and first capacitive element, so as to store energy in the first capacitive element, when the first switch is in a non-conductive state,
energy stored by the first capacitive element is discharged by the conduction of current through the second winding, so as to store energy in the second winding, when the second switch is in a conductive state, and
no circuit path exists for the first capacitive element to discharge stored energy by the conduction of current through the first winding.

33. The power factor correction device of claim 32, further comprising:
a second unidirectional current element that conducts current unidirectionally; and
a second capacitive element, wherein:
the first and second switches, first and second capacitive elements, and first and second unidirectional elements are coupled such that when coupled with the first and second windings and the full-wave rectified voltage source:
energy stored by the second winding is discharged by the conduction of current through the second unidirectional current element and the second capacitive element, so as to store energy in the second capacitive element.

34. The power factor correction device of claim 33, further comprising:
a third switch, wherein:
the first, second, and third switches, first and second capacitive elements, and first and second unidirectional elements are coupled such that when coupled with the first and second windings, a third winding of the motor, and the full-wave rectified voltage source:
energy stored by the second capacitive element is discharged by the conduction of current through the third winding, so as to store energy in the third winding, when the third switch is in a conductive state.

35. The power factor correction device of claim 34, further comprising:
a third unidirectional current element that conducts current unidirectionally, wherein:
the first, second, and third switches, first and second capacitive elements, and first, second, and third unidirectional elements are coupled such that when coupled with the first, second, and third windings and the full-wave rectified voltage source:
energy stored by the third winding is discharged by the conduction of current through the third unidirectional current element and first capacitive element, so as to store energy in the first capacitive element, when the third switch is in a non-conductive state.

* * * * *